United States Patent
Castet

(10) Patent No.: US 10,831,532 B2
(45) Date of Patent: Nov. 10, 2020

(54) UPDATING A NESTED VIRTUALIZATION MANAGER USING LIVE MIGRATION OF VIRTUAL MACHINES

(71) Applicant: International Business Machines Corporation, Armonk, NY (US)

(72) Inventor: Nicolas Vincent Ismael Castet, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 16/165,673

(22) Filed: Oct. 19, 2018

(65) Prior Publication Data

US 2020/0125382 A1 Apr. 23, 2020

(51) Int. Cl.
| | | |
|---|---|---|
| G06F 9/455 | (2018.01) | |
| G06F 9/48 | (2006.01) | |
| G06F 8/65 | (2018.01) | |
| H04L 12/46 | (2006.01) | |
| H04L 12/931 | (2013.01) | |

(52) U.S. Cl.
CPC .............. G06F 9/4856 (2013.01); G06F 8/65 (2013.01); G06F 9/45558 (2013.01); *G06F 2009/4557* (2013.01); *G06F 2009/45562* (2013.01); *G06F 2009/45566* (2013.01); *H04L 12/4641* (2013.01); *H04L 49/70* (2013.01)

(58) Field of Classification Search
CPC .. G06F 9/452; G06F 9/45558; G06F 12/0261; G06F 12/02; G06F 9/4856; G06F 2009/45566; G06F 2009/4557; G06F 2009/45562; H04L 12/4641; H04L 49/70
See application file for complete search history.

(56) References Cited

U.S. PATENT DOCUMENTS 6,324,549 B1 * 11/2001 Gomi .................. G06F 12/0261
8,327,353 B2    12/2012 Traut
(Continued)

OTHER PUBLICATIONS

Clark et al., "Live Migration of Virtual Machines", NSDI '05: Second Symposium on Networked Systems Design & Implementation, pp. 273-286, 2005.

*Primary Examiner* — Tuan A Vu
(74) *Attorney, Agent, or Firm* — Martin & Associates, LLC; Derek P. Martin

(57) ABSTRACT

A parent virtualization manager can create multiple nested virtualization environments on the same physical server. When nested virtualization controller code in a first nested virtualization environment needs to be updated, the parent virtualization manager creates a second nested virtualization environment, installs the updated virtualization controller code in the second nested virtualization environment, and live-migrates virtual machines from the first nested virtualization environment to the second nested virtualization environment. The amount of resources needed for the live migration within the second nested virtualization manager is the amount of resources in the largest virtual machine to be live-migrated, since resources in the first nested virtualization environment can be reclaimed by the parent virtualization manager and allocated to the second nested virtualization manager after a virtual machine has been live-migrated to the second nested virtualization environment.

9 Claims, 8 Drawing Sheets

(56) References Cited

U.S. PATENT DOCUMENTS

| | | | |
|---|---|---|---|
| 9,798,567 B2 | 10/2017 | Hu et al. | |
| 2012/0278580 A1* | 11/2012 | Malige | G06F 12/02 |
| | | | 711/166 |
| 2013/0326519 A1 | 12/2013 | Anderson et al. | |
| 2014/0115576 A1* | 4/2014 | Kothari | G06F 9/45558 |
| | | | 718/1 |
| 2014/0229943 A1 | 8/2014 | Tian et al. | |
| 2017/0083347 A1* | 3/2017 | Li | G06F 9/452 |
| 2017/0139730 A1* | 5/2017 | Cropper | G06F 9/45558 |
| 2017/0329622 A1 | 11/2017 | Sherwin, Jr. et al. | |
| 2017/0371693 A1 | 12/2017 | Corrie et al. | |
| 2018/0052701 A1* | 2/2018 | Kaplan | G06F 9/45558 |
| 2018/0088975 A1* | 3/2018 | Kaul | G06F 9/45558 |
| 2019/0340003 A1* | 11/2019 | Ramanathan | G06F 9/4856 |

* cited by examiner

UPDATING A NESTED VIRTUALIZATION MANAGER USING LIVE MIGRATION OF VIRTUAL MACHINES

BACKGROUND

1. Technical Field

This disclosure generally relates to virtualization of computer resources, and more specifically relates to updating code in a nested virtualization manager.

2. Background Art

The concept of virtualizing computer resources is very well-known in the area of cloud computing. Virtualization managers, often referred to as "hypervisors", create virtual computer systems, often referred to as "virtual machines", on a physical server. The virtualization manager manages the virtual machines in a way that each virtual machine appears to its users to be a separate and distinct computer server, even though there may be several virtual machines executing on the same physical server by the virtualization manager.

Because the field of virtualization is quickly evolving, the code for a virtualization manager often needs to be updated. Updating virtualization manager code can be disruptive to virtual machines that the virtualization manager is running, especially when the virtualization manager code has to be rebooted. Many applications running on virtual machines must have high availability, and cannot be shut down for several minutes while virtualization manager code is updated. One solution to this problem is to live-migrate running virtual machines to a different computer system, a spare physical server that has at least as many hardware resources as the computer system running the virtual machines. Live migration means a virtual machine is moved without shutting down the virtual machine. The spare physical server can have the updated virtualization manager code installed, followed by live-migrating the running virtual machines from the old physical server to the spare physical server. There is a performance penalty in live-migrating virtual machines because their memory state must be streamed over a network connection to the new computer system. During the streaming of the memory state to the spare physical server, the virtual machine being live-migrated will be temporarily unavailable. However, the unavailability is for a very short time, compared to the unavailability that is orders of magnitudes greater that would result from stopping the virtual machine, updating the virtualization manager code, restarting the virtualization manager, and restarting the virtual machine.

While providing a spare server so virtual machines may be live-migrated to the spare server when the virtualization software needs to be updated provides much better service by minimizing downtime of the virtual machines, this comes at a significant cost. Servers are expensive, and having a spare server sitting unused for a majority of the time is an inefficient use of an expensive resource.

BRIEF SUMMARY

A parent virtualization manager can create multiple nested virtualization environments on the same physical server. When nested virtualization controller code in a first nested virtualization environment needs to be updated, the parent virtualization manager creates a second nested virtualization environment, installs the updated virtualization controller code in the second nested virtualization environment, and live-migrates virtual machines from the first nested virtualization environment to the second nested virtualization environment. The amount of resources needed for the live migration within the second nested virtualization manager is the amount of resources in the largest virtual machine to be live-migrated, since resources in the first nested virtualization environment can be reclaimed by the parent virtualization manager and allocated to the second nested virtualization manager after a virtual machine has been live-migrated to the second nested virtualization environment.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 8:
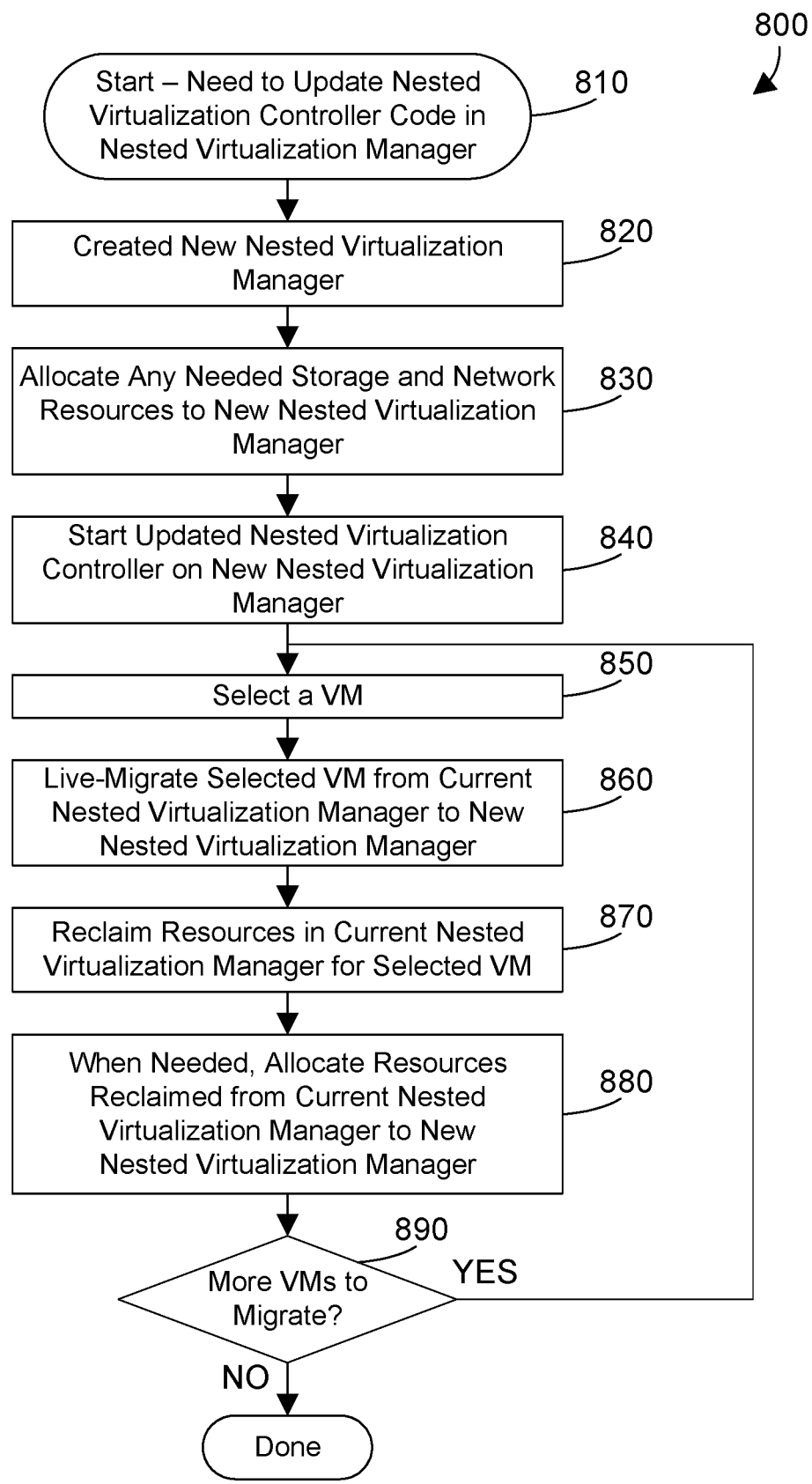
Figure 9:
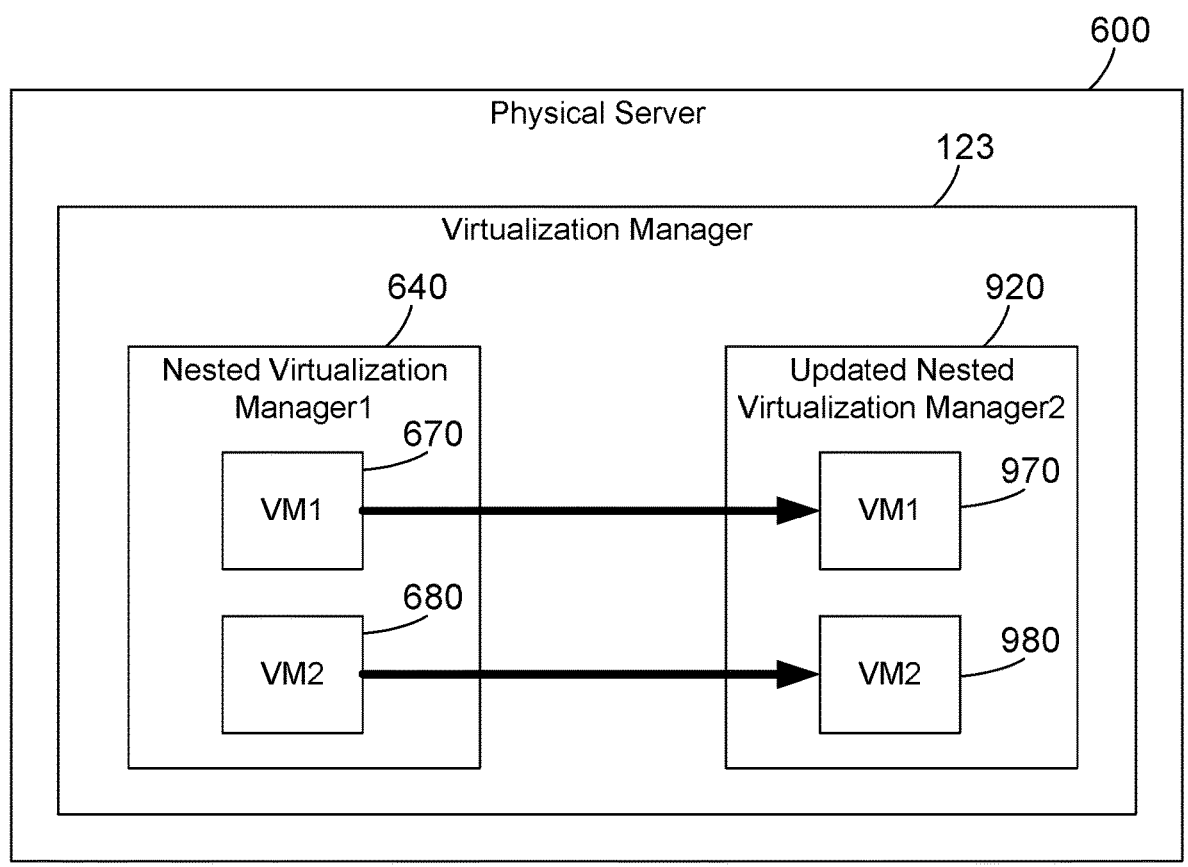

FIG. 8 is a flow diagram of a method for updating nested virtual controller code by creating a second nested virtualization manager and live-migrating virtual machines from the first nested virtualization manager to the second nested virtualization manager; and FIG. 9 is a block diagram showing live migration of virtual machines to an updated nested virtualization manager in the same parent virtualization manager.

DETAILED DESCRIPTION

The disclosure and claims herein are directed to a parent virtualization manager that can create multiple nested virtualization environments on the same physical server. When nested virtualization controller code in a first nested virtualization environment needs to be updated, the parent virtualization manager creates a second nested virtualization environment, installs the updated virtualization controller code in the second nested virtualization environment, and live-migrates virtual machines from the first nested virtualization environment to the second nested virtualization environment. The amount of resources needed for the live migration within the second nested virtualization manager is the amount of resources in the largest virtual machine to be live-migrated, since resources in the first nested virtualization environment can be reclaimed by the parent virtualization manager and allocated to the second nested virtualization manager after a virtual machine has been live-migrated to the second nested virtualization environment.

Figure 1:
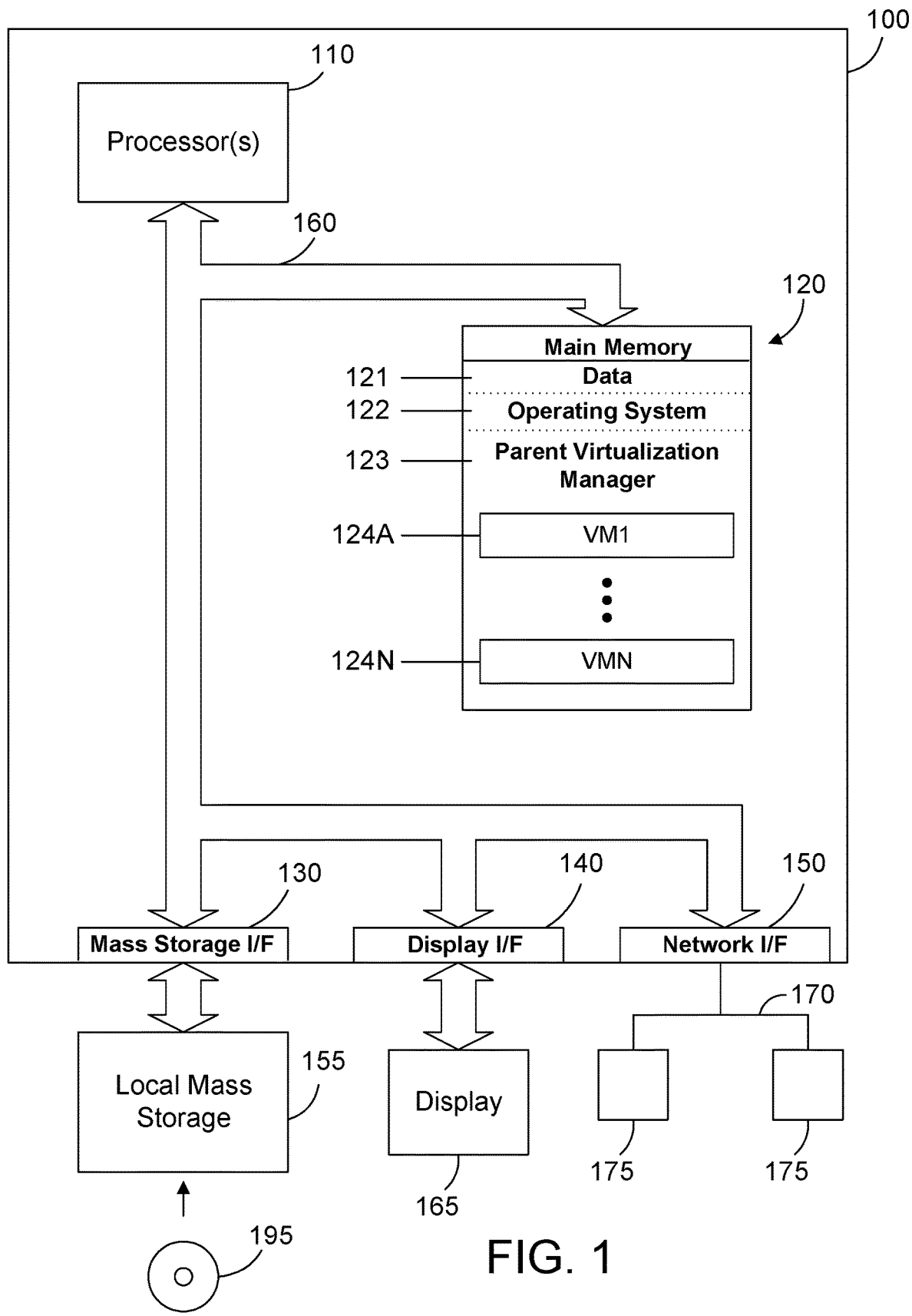
FIG. 1 is a block diagram of a computer system that includes a parent virtualization manager.

Referring to FIG. 1, a computer system 100 is one suitable implementation of a computer system that includes a virtualization manager as described in more detail below. Computer system 100 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such as a thumb drive.

Main memory 120 preferably contains data 121, an operating system 122, and a parent virtualization manager 123. Data 121 represents any data that serves as input to or output from any program in computer system 100. Operating system 122 is a multitasking operating system, such as AIX or LINUX. Parent virtualization manager 123 is capable of defining and managing multiple nested virtualization managers that include multiple virtual machines, shown in FIG. 1 as VM1 124A, . . . , VMN 124N. While virtual machines VM1 124A, . . . , VMN 124N are shown to reside in memory 120, one skilled in the art will appreciate that known virtual machines include virtual hardware resources, such as virtual processors, virtual memory, and virtual local area networks, that do not reside in memory.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and parent virtualization manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the parent virtualization manager 123.

Although computer system 100 is shown to contain only a single processor and a single system bus, those skilled in the art will appreciate that a virtualization manager as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
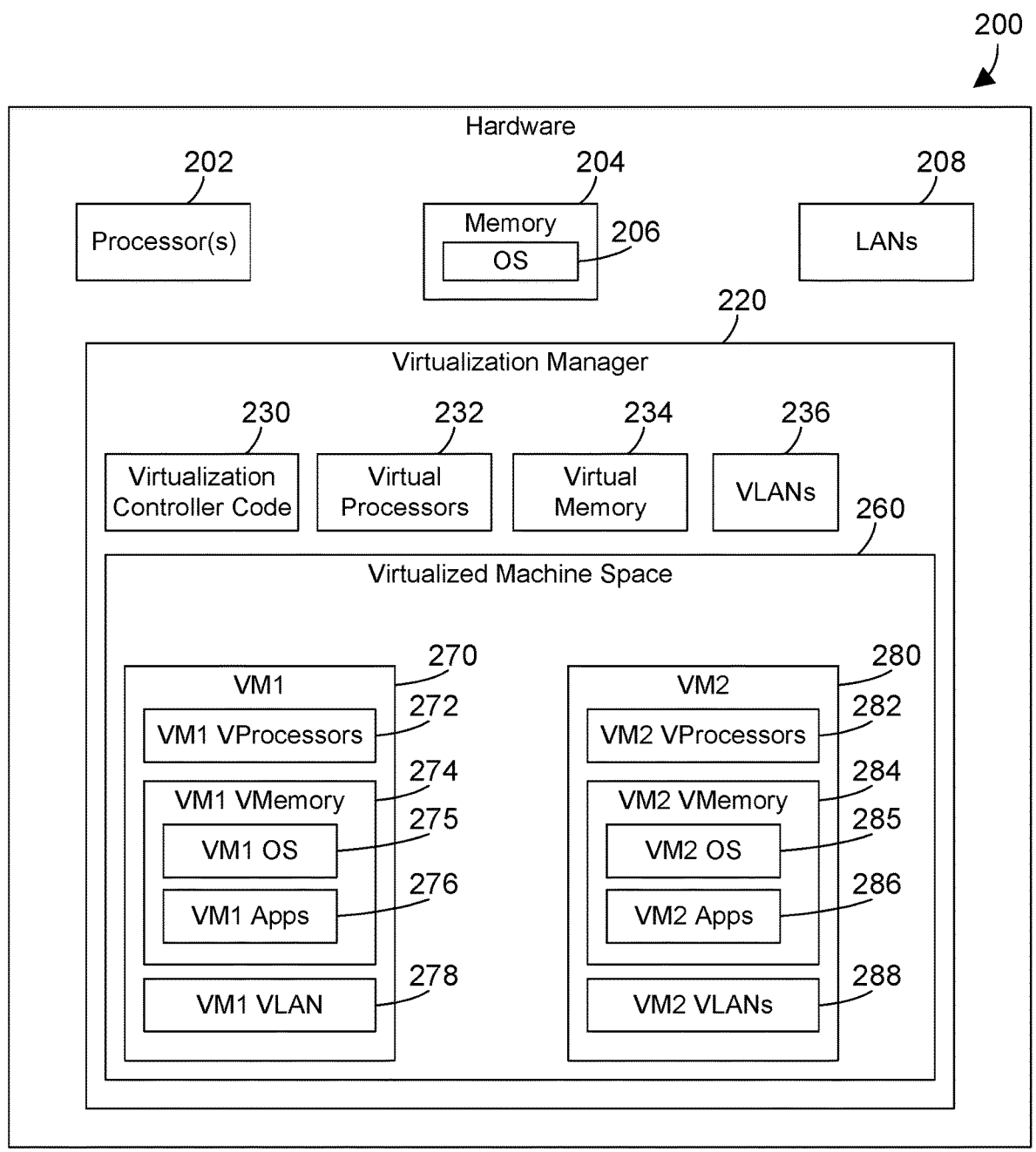
FIG. 2 is a block diagram of a hierarchical view of a known virtualization manager.

FIG. 2 shows one sample system that represents a prior art server 200. Server 200 includes one or more processors 202, memory 204 that includes an operating system 206, and one or more local area networks (LANs) 208. Processors 202, memory 204, operating system 206 and LANs 208 are similar to the processors 110, memory 120, operating system 122, and network interface 150, respectively, discussed above with reference to FIG. 1. Server 200 includes a virtualization manager 220. One known virtualization manager provided by IBM is known as a Hypervisor. The virtualization manager 220 includes virtualization controller code 230, virtual processors 232, virtual memory 234, and virtual LANs (VLANs) 236. The virtual processors 232 are processors allocated by the virtualization manager 220 that correspond to one or more physical processors 202. The virtual memory 234 is memory allocated by the virtualization manager 220 that corresponds to a portion of the physical memory 204. The VLANs 236 are allocated by the virtualization manager 220 and correspond to one or more physical LANs 208. The virtualization manager 220 can create virtual machines in a virtualized machine space 260. The specific example in FIG. 2 show two virtual machines VM1 270 and VM2 280 in the virtualized machine space 260. VM1 270 includes virtual processors 272 allocated to VM1 by the virtualization manager from virtual processors 232. VM1 270 also includes virtual memory 274 that includes an operating system 275 and one or more software applications 276. VM1 270 also includes a VLAN 278. VM2 280 includes similar features, including one or more virtual processors 282 allocated from the virtual processors 232; virtual memory 284 allocated from the virtual memory 234, with a corresponding operating system 285 and software applications 286, and VLANs 288 allocated from the VLANs 236.

Because virtualization is a field that is rapidly changing, the virtualization controller code 230 in the virtualization manager 220 may need to be updated rather frequently. Updating the virtualization controller code 230 typically requires shutting down the VMs 270 and 280, updating the virtualization controller code 230, restarting the virtualization controller code 230, then creating and running the two VMs 270 and 280. This can be a very time-consuming process that would leave the VMs 270 unavailable for a significant period of time. Many applications running on virtual machines cannot be shut down for the period of time that would be required to update the virtualization controller code 230 as described above. One way to provide less downtime for the VMs is to provide a spare physical server, and when the virtualization controller code 230 needs to be updated, the updated virtualization controller code 230 can be run on the spare physical server, and the virtual machines 270 and 280 can then be live-migrated to the spare physical server. The live migration of the virtual machines 270 and 280 necessarily requires their memory state to be streamed over a network connection to the spare physical server, which makes the virtual machines 270 and 280 unavailable during the time the memory state is being streamed to the new physical server. This downtime, however, is orders of magnitude less than the downtime that would result from updating the virtualization controller code 230 by stopping the virtual machines, updating the virtualization controller code 230, the re-creating and running the virtual machines, as described above.

Figure 3:
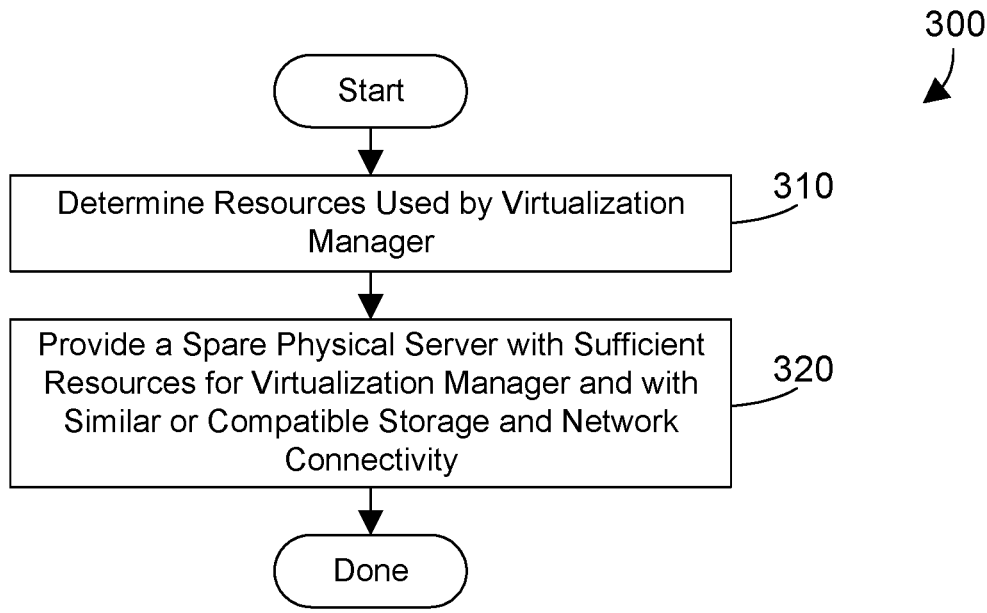
FIG. 3 is a flow diagram of a method for providing a spare physical server so virtual machines may be live-migrated to the spare physical server when the virtualization controller code in the virtualization manager needs to be updated.

Referring to FIG. 3, a method 300 is a way to provide a spare physical server as described above. Determine resources used by the virtualization manager (step 310). This includes all resources for the virtualization manager itself, as well as all resources allocated to all of the virtual machines managed by the virtualization manager. A spare physical server is then provided with sufficient resources for the virtualization manager and with similar or compatible storage and network connectivity (step 320). Needless to say, having a spare server sit around unused most of the time is very costly, and not an efficient usage of resources. But this solution does vastly reduce the downtime for virtual machines when virtualization controller code needs to be updated.

Once the spare physical server is provided in step 320 in FIG. 3, the spare physical server can be used to minimize downtime of the virtual machines when the virtualization controller code needs to be updated. Method 400 starts with a need to update the virtualization controller code (step 410). The updated version of the virtualization controller code is installed and started on the spare physical server (step 420). The virtual machines are then live-migrated to the spare physical server, which includes streaming the memory over the network (step 430). Method 400 is then done. In the most preferred implementation, the older physical server would then become the spare physical server. In a different implementation, the virtualization controller code on the original server could be updated, and the virtual machines could be live-migrated back from the spare physical server to the original server. This incurs the performance penalty of moving the virtual machines twice, and is therefore less desirable than making the old physical server the new spare physical server.

Figure 4:
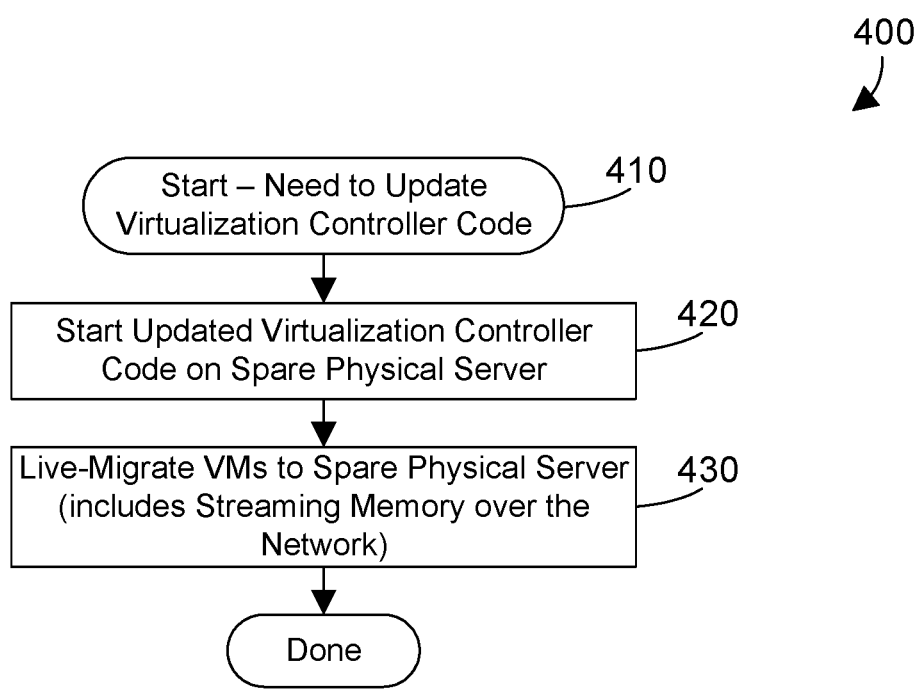
FIG. 4 is a flow diagram of a method for updating virtualization controller code.
Figure 5:
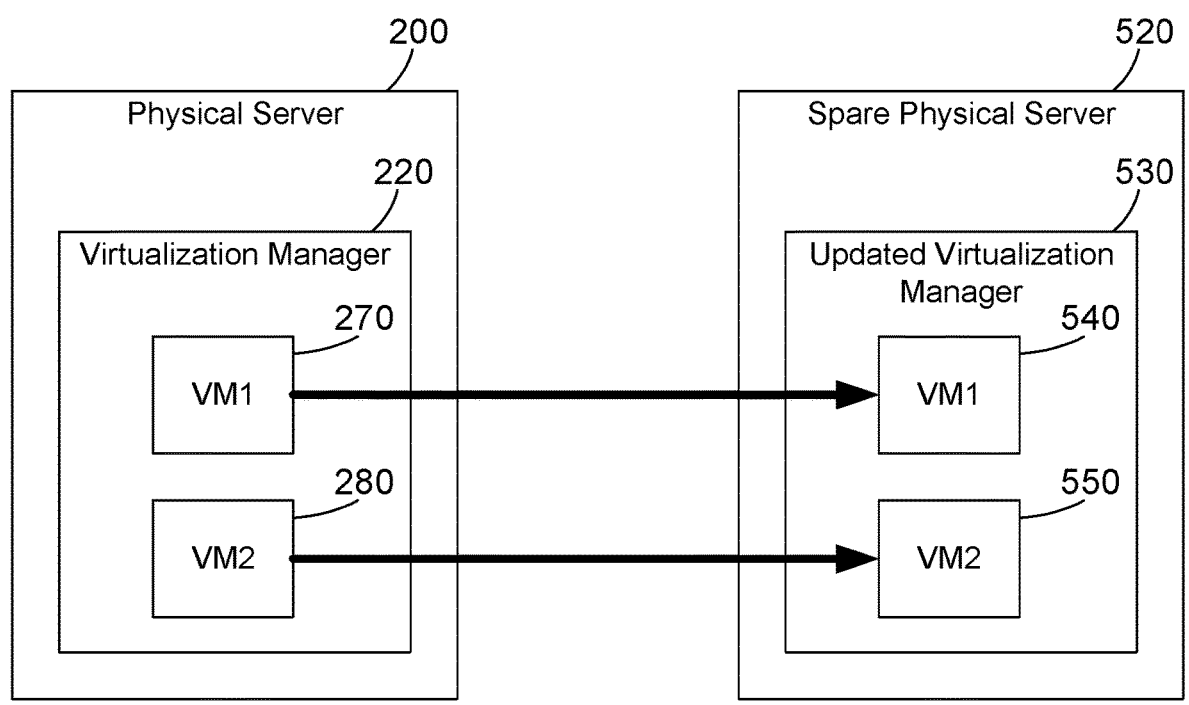
FIG. 5 is a block diagram showing live migration of virtual machines to an updated virtualization manager on a spare physical server.

The method 400 in FIG. 4 is represented graphically in FIG. 5. A first physical server 200 represents server 200 shown in FIG. 2, with some of the details omitted in FIG. 5 for the sake of clarity. The physical server 200 includes a virtualization manager 220 that manages two virtual machines 270 and 280. The spare physical server 520 includes at least as many resources as the physical server 200. When the virtualization controller code (230 in FIG. 2) in the virtualization manager 220 needs to be updated, the updated virtualization controller code is loaded on the spare physical server 520 and run, resulting in an updated virtualization manager 530. The virtual machines 270 and 280 are then live-migrated to the updated virtualization manager 530 in the spare physical server 520, as shown by the arrows in FIG. 5, resulting in the live-migrated virtual machines 540 and 550. As discussed above, the live migration process includes streaming the memory state of the virtual machines over a network connection, which can take some time. However, the downtime of the virtual machines is much less that what would be required if the spare physical server 520 were not available.

Figure 6:
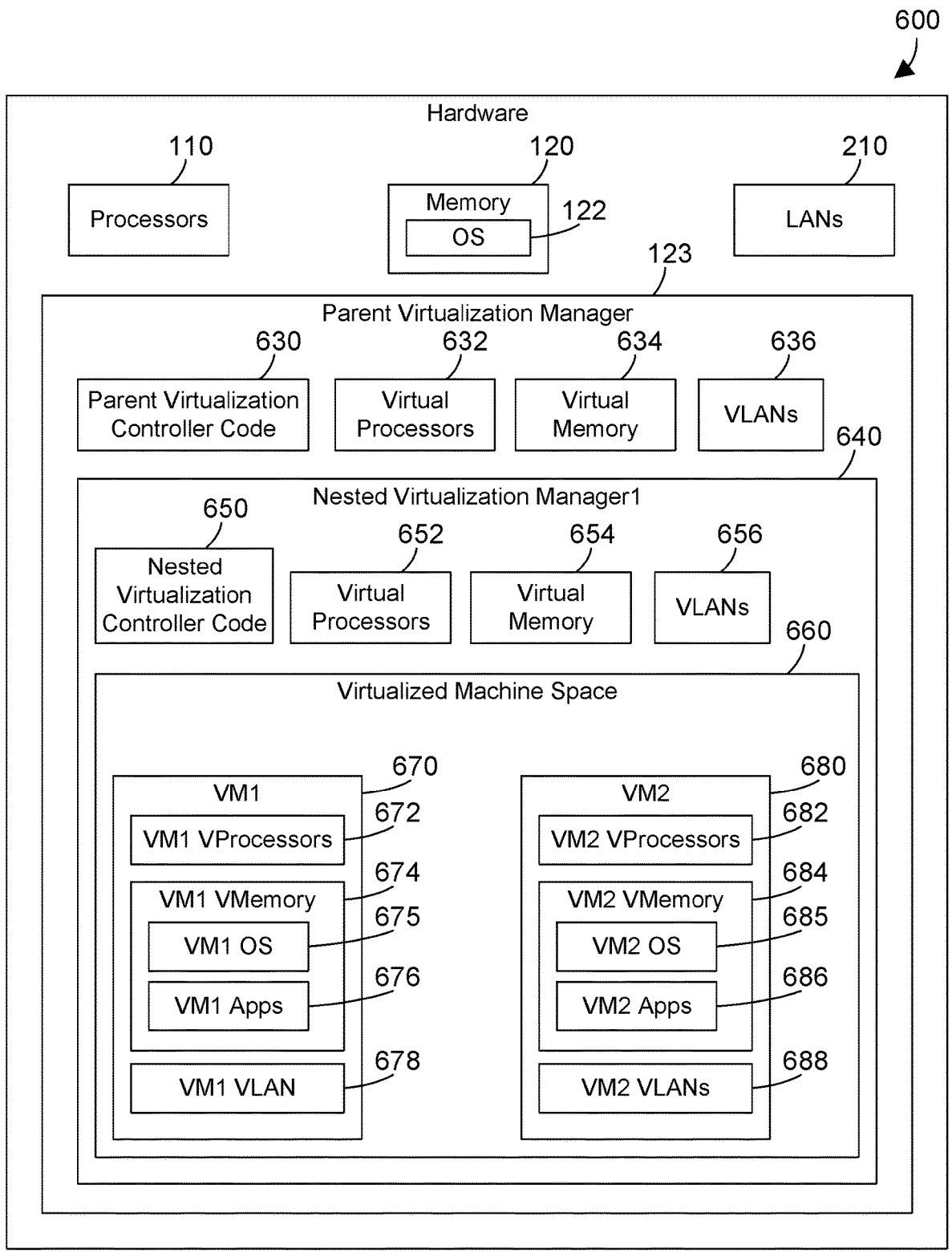
FIG. 6 is a block diagram of a hierarchical view of the parent virtualization manager shown in FIG. 1.

An improvement to the system and methods in FIGS. 2-5 is possible by using nested virtualization, and is the subject of the disclosure and claims herein. Referring to FIG. 6, a server 600 provides one or more processors 110, memory 120 with an operating system 122, and LANs 210. Processors 100 memory 120 and operating system 122 are also shown in FIG. 1. A parent virtualization manager 123 as shown in FIG. 1 includes parent virtualization controller code 630, virtual processors 632, virtual memory 634, and VLANs 636. The parent virtualization manager 123 can create multiple nested virtualization managers. FIG. 6 shows a nested virtualization manager1 640 nested within the parent virtualization manager 123. The nested virtualization manager1 6407 includes nested virtualization controller code 650, virtual processors 652, virtual memory 654, and VLANs 656. The nested virtualization manager1 640 also provides a virtual machine space 660 where multiple virtual machines can run, including VM1 670 and VM2 680. VM1 670 includes virtual processors 672, virtual memory 674 that includes an operating system 675 and one or more applications 676, and a VLAN 678. VM2 680 similarly includes virtual processors 682, virtual memory 684 that includes an operating system 685 and one or more applications 686, and VLANs 688. Adding the parent virtualization manager 123 adds a layer of complexity and overhead. But the advantages are significant when the virtualization controller code 650 in nested virtualization manager1 640 needs to be updated.

Figure 7:
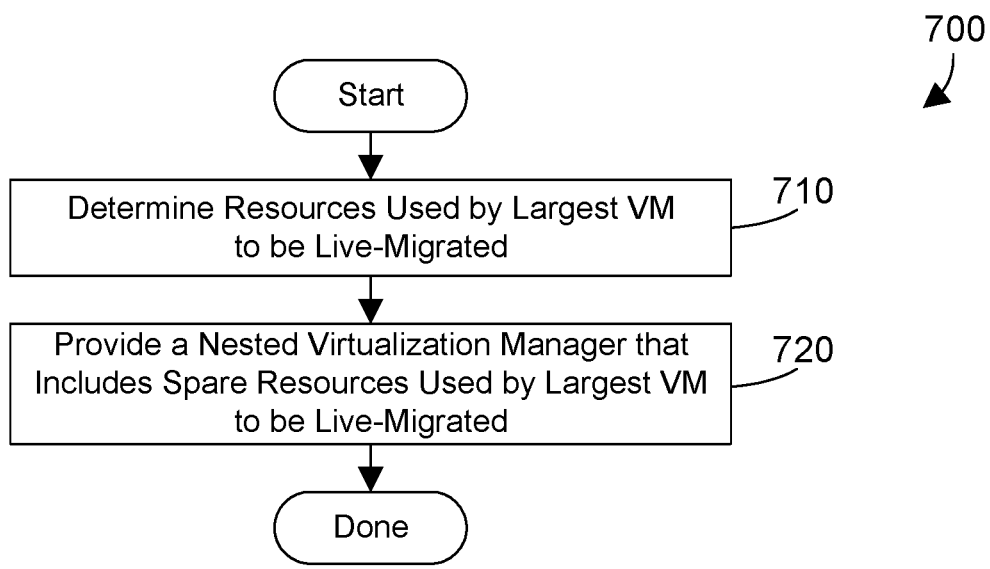
FIG. 7 is a flow diagram of a method for providing spare resources in a parent virtualization manager so virtual machines may be live-migrated to an updated nested virtualization manager residing in the same parent virtualization manager.

When a nested virtualization environment such as shown in FIG. 6 is used, there is no need to provide a spare physical server. Instead, the same physical server can have some spare resources to allow live-migrating from one nested virtualization environment to another on the same physical server. In addition, the spare resources that are needed are significantly less than all of the resources on a physical server. Referring to FIG. 7, a method 700 begins by determining resources used by the largest VM to be live-migrated (step 710). A nested virtualization manager is then provided that includes spare resources used by the largest VM to be live-migrated (step 720). Method 700 is then done. The reason so fewer resources are needed in this scenario is because resources in a virtual machine that has been live-migrated to a different nested virtualization manager can be reclaimed by the parent virtualization manager. There is thus no need to provide a spare physical server, or to provide the same amount of resources as on the spare physical server.

Referring to FIG. 8, a method 800 is preferably performed by the parent virtualization controller code 630 in FIG. 6. Method 800 starts when there is a need to update the nested virtualization controller code in a nested virtualization manager (step 810), such as the nested virtualization controller code 650 in the nested virtualization manager1 640 in FIG. 6. A nested virtualization manager is created (step 820), which includes performing method 700 in FIG. 7. Any needed storage and network resources are allocated to the newly created nested virtualization manager (step 830). The updated nested virtualization controller code is installed and started on the new nested virtualization manager (step 840). One of the virtual machines in the old nested virtualization manager is selected (step 850). The selected virtual machine is live-migrated from the current nested virtualization manager to the new nested virtualization manager (step 860). The resources in the current nested virtualization manager for the virtual machine that was just live-migrated are reclaimed (step 870). The reclaiming of resources in step 870 is very straightforward since it is the same parent virtualization manager that manages resources in both the current nested virtualization manager and the new nested virtualization manager. When needed, resources reclaimed from the current nested virtualization manager can be allocated to the new nested virtualization manager (step 880). When there are more virtual machines to migrate (step 890=YES), method 800 returns to step 850 and continues until there are no more VMs to migrate (step 890=N0). Method 800 is then done.

Method 800 in FIG. 8 is represented graphically in FIG. 9. A physical server 600 in FIG. 9 is the same as physical server 600 in FIG. 6, with some details omitted for the sake of clarity. The physical server 600 need only have enough spare resources for the largest VM that will need to be live-migrated. The physical server 600 includes the parent virtualization manager 123, which includes a first nested virtualization manager 640 that includes two virtual machines 670 and 680. When the nested virtualization controller code in nested virtualization manager1 640 needs to be updated, a new nested virtualization manager is created, and the updated virtualization controller code is installed and started, resulting in the updated nested virtualization manager2 920. The virtual machine 670 is then live-migrated to the updated nested virtualization manager 920, resulting in virtual machine 970. Once the live-migration of the virtual machine 670 is complete, the resources allocated to virtual machine 670 can be reclaimed by the parent virtualization manager 123. Because the parent virtualization manager 123 allocates resources to both nested virtualization managers 640 and 920, the resources reclaimed from virtual machine 670 may be allocated to the updated nested virtualization manager 920 before the second virtual machine is live-migrated, if needed. The second virtual machine 680 is then live-migrated to the updated nested virtualization manager 920, resulting in virtual machine 980. Once the live migration of the second virtual machine 680 is complete, the resources allocated to the second virtual machine 680 can be reclaimed by the parent virtualization manager 123.

By providing a virtualization manager that can created multiple nested virtualization managers, instead of live-migrating virtual machines to a spare physical server, the nested virtualization manager can instead create a new nested virtualization manager on the same physical server, then live-migrate the virtual machines to the new nested virtualization manager. Because the memory state does not have to be streamed over a network connection, the live migration of the virtual machines within a virtualization manager causes much less downtime for the virtual machines than when live-migrating virtual machines to a spare physical server. In addition, because the current and new nested virtualization managers within the virtualization manager are on the same physical server, they will both have access to the same or similar network and storage resources. While the parent virtualization manager 123 adds an additional layer of overhead, the ability to easily live-migrate virtual machines when nested virtualization controller code needs to be updated with a minimum amount of downtime for the virtual machines makes this an attractive alternative when downtime of virtual machines needs to be minimized.

The parent virtualization manager 123 includes parent virtualization controller code 630, as shown in FIG. 6. When the parent virtualization controller code 630 needs to be updated, the same issues apply as in the above discussion with respect to FIGS. 2-5. Thus, the parent virtualization controller 123 provides an easy way to update nested virtualization controller code in one of its nested virtualization managers, but this does not extend to updating the parent virtualization controller code 630.

The disclosure and claims herein support a server computer system comprising: at least one processor; a memory coupled to the at least one processor; and parent virtualization controller code residing in the memory and executed by the at least one processor, the parent virtualization controller code, when executed, providing a parent virtualization manager comprising a first nested virtualization manager having first nested virtualization controller code that creates and manages first and second virtual machines, and when the first nested virtualization controller code needs to be updated, the parent virtualization manager installs and starts updated nested virtualization controller code on the server computer system to provide a second nested virtualization manager having the updated nested virtualization controller code and managed by the parent virtualization manager, wherein the parent virtualization manager live-migrates the first virtual machine from the first nested virtualization manager to the second nested virtualization manager to provide a third virtual machine created and managed by the second nested virtualization manager.

The disclosure and claims herein further support a server computer system comprising: at least one processor; a memory coupled to the at least one processor; and virtualization controller code residing in the memory and executed by the at least one processor, the virtualization controller code, when executed, providing a parent virtualization manager comprising: a first nested virtualization manager having first nested virtualization controller code that creates and manages first and second virtual machines; wherein the parent virtualization manager comprises spare resources at least as great as a largest virtual machine created and managed by the first nested virtualization manager; when the first nested virtualization controller code needs to be updated, the parent virtualization manager installs and starts updated nested virtualization controller code to provide a second nested virtualization manager having updated nested virtualization controller code and managed by the parent virtualization manager, wherein the parent virtualization manager: live-migrates the first virtual machine from the first nested virtualization manager to the second nested virtualization manager to provide a third virtual machine created and managed by the second nested virtualization manager; after live-migrating the first virtual machine to the second nested virtualization manager, reclaims at least one resource allocated to the first virtual machine; after reclaiming the at least one resource from the first virtual machine, allocates the at least one resource to the second nested virtualization manager; live-migrates the second virtual machine to the second nested virtualization manager to provide a fourth virtual machine; and after live-migrating the second virtual machine to the second nested virtualization manager, reclaims at least one resource allocated to the second virtual machine.

The disclosure and claims herein additionally support a computer-implemented method executed by at least one processor for updating nested virtualization manager code, the method comprising: providing a parent virtualization manager comprising: a first nested virtualization manager having first nested virtualization controller code that creates and manages first and second virtual machines; when the first nested virtualization controller code needs to be updated, installing and starting updated nested virtualization controller code to provide a second nested virtualization manager on a same server computer system as the first nested virtualization manager having the updated nested virtualization controller code; and live-migrating the first virtual machine from the first nested virtualization manager to the second nested virtualization manager to provide a third virtual machine created and managed by the second nested virtualization manager.

A parent virtualization manager can create multiple nested virtualization environments on the same physical server. When nested virtualization controller code in a first nested virtualization environment needs to be updated, the parent virtualization manager creates a second nested virtualization environment, installs the updated virtualization controller code in the second nested virtualization environment, and live-migrates virtual machines from the first nested virtualization environment to the second nested virtualization environment. The amount of resources needed for the live migration within the second nested virtualization manager is the amount of resources in the largest virtual machine to be live-migrated, since resources in the first nested virtualization environment can be reclaimed by the parent virtualization manager and allocated to the second nested virtualization manager after a virtual machine has been live-migrated to the second nested virtualization environment.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A server computer system comprising:
 at least one processor;
 a memory coupled to the at least one processor; and
 parent virtualization controller code residing in the memory and executed by the at least one processor, the parent virtualization controller code, when executed, providing a parent virtualization manager comprising a first nested virtualization manager having first nested virtualization controller code that creates and manages first and second virtual machines, wherein the parent virtualization manager comprises spare resources at least as great as a largest virtual machine created and managed by the first nested virtualization manager, wherein when the first nested virtualization controller code needs to be updated, the parent virtualization manager installs and starts updated nested virtualization controller code on the server computer system to provide a second nested virtualization manager having the updated nested virtualization controller code and managed by the parent virtualization manager, wherein the second nested virtualization manager has fewer resources than the first nested virtualization manager, wherein the parent virtualization manager live-migrates the first virtual machine from the first nested virtualization manager to the second nested virtualization manager to provide a third virtual machine created and managed by the second nested virtualization manager, wherein, after live-migrating the first virtual machine to the second nested virtualization manager, the parent virtualization manager reclaims at least one resource allocated to the first virtual machine and allocates at least one resource reclaimed from the first virtual machine to the second nested virtualization manager.

2. The server computer system of claim 1, wherein the parent virtualization manager live-migrates the second virtual machine to the second nested virtualization manager to provide a fourth virtual machine.

3. The server computer system of claim 2 wherein, after live-migrating the second virtual machine to the second nested virtualization manager, the parent virtualization manager reclaims at least one resource allocated to the second virtual machine.

4. The server computer system of claim 3 wherein the parent virtualization controller allocates at least one resource reclaimed from the second virtual machine to the second nested virtualization manager.

5. A server computer system comprising:
 at least one processor;
 a memory coupled to the at least one processor; and
 virtualization controller code residing in the memory and executed by the at least one processor, the virtualization controller code, when executed, providing a parent virtualization manager comprising:
  a first nested virtualization manager having first nested virtualization controller code that creates and manages first and second virtual machines;
  wherein the parent virtualization manager comprises spare resources at least as great as a largest virtual machine created and managed by the first nested virtualization manager;
  wherein when the first nested virtualization controller code needs to be updated, the parent virtualization manager installs and starts updated nested virtualization controller code to provide a second nested virtualization manager having updated nested virtualization controller code and managed by the parent virtualization manager, wherein the second nested virtualization manager has fewer resources than the first nested virtualization manager, wherein the parent virtualization manager:
   live-migrates the first virtual machine from the first nested virtualization manager to the second nested virtualization manager to provide a third virtual machine created and managed by the second nested virtualization manager;
   after live-migrating the first virtual machine to the second nested virtualization manager, reclaims at least one resource allocated to the first virtual machine;
   after reclaiming the at least one resource from the first virtual machine, allocates the at least one resource to the second nested virtualization manager;
   live-migrates the second virtual machine to the second nested virtualization manager to provide a fourth virtual machine; and after live-migrating the second virtual machine to the second nested virtualization manager, reclaims at least one resource allocated to the second virtual machine.

6. A computer-implemented method executed by at least one processor for updating nested virtualization manager code, the method comprising:

providing a parent virtualization manager comprising a first nested virtualization manager having first nested virtualization controller code that creates and manages first and second virtual machines, wherein the parent virtualization manager comprises spare resources at least as great as a largest virtual machine created and managed by the first nested virtualization manager;

when the first nested virtualization controller code needs to be updated, the parent virtualization manager installing and starting updated nested virtualization controller code to provide a second nested virtualization manager on a same server computer system as the first nested virtualization manager having the updated nested virtualization controller code wherein the second nested virtualization manager has fewer resources than the first nested virtualization manager;

the parent virtualization manager live-migrating the first virtual machine from the first nested virtualization manager to the second nested virtualization manager to provide a third virtual machine created and managed by the second nested virtualization managers;

after live-migrating the first virtual machine to the second nested virtualization manager, the parent virtualization manager reclaiming at least one resource allocated to the first virtual machine; and the parent virtualization manager allocating at least one resource reclaimed from the first virtual machine to the second nested virtualization manager.

7. The method of claim 6 further comprising live-migrating the second virtual machine to the second nested virtualization manager to provide a fourth virtual machine.

8. The method of claim 7 wherein, after live-migrating the second virtual machine to the second nested virtualization manager, reclaiming at least one resource allocated to the second virtual machine.

9. The method of claim 8 further comprising allocating at least one resource reclaimed from the second virtual machine to the second nested virtualization manager.

* * * * *